Patented Dec. 12, 1939

2,183,259

UNITED STATES PATENT OFFICE 2,183,259

PROCESS FOR RECOVERING AND REUSING CONSTITUENTS OF WAXED PAPER

Arnold M. Hill, Orange, N. J., assignor to National Oil Products Company, Harrison, N. J., a corporation of New Jersey No Drawing. Application March 3, 1937.
Serial No. 128,792

7 Claims. (Cl. 92—3)

This invention relates to methods for recovering and reusing both wax and pulp fibers contained in waste waxed papers.

To supply the demand for water-repellent paper, which is largely used both for packaging material and for many other purposes in connection with which a paper of substantially moistureproof character is desired, the paper manufacturing industry has produced types of paper which are either impregnated or sized with a suitable mineral, vegetable or animal wax, or which are coated with such wax. The waxes are in some cases incorporated with the paper stock or pulp in the form of a wax size prior to the formation of the paper sheet, or the wax, in hot fluid condition is applied to the surface of the formed paper sheet as a coating. The waxes so used may or may not be combined with other ingredients such as plasticizing or thermoplastic materials.

For industrial use or conversion of waxed paper considerable waste is accumulated, due to the fact that trade requirements demand stock of various definite sizes and shapes, which necessitates cutting or trimming of the paper to satisfy such requirements. The waste cuttings so accumulated are known as "broke". Various attempts have been made without success to re-use this waste or "broke". In most cases, however, such waste or "broke" has been destroyed or at best sold for use as a cheap packing or padding material.

The instant invention has for an object to provide novel methods whereby recovery and re-use, in paper making operations, of both the wax and the paper pulp or fibers contained in waste waxed paper may be attained; and the invention has for further objects to provide methods whereby the recovered wax and pulp or fibers may be together re-used in the making of new wax sized paper, or whereby the wax and pulp or fibers may be separated and individually re-used in paper making.

By the novel methods according to the instant invention, all waxes of the kinds generally employed in the making of waxed paper may be easily and efficiently recovered and re-used, and the novel recovery process is effective as to all mineral, vegetable and animal waxes used in waxed paper manufacture, such e. g. as paraffin, carnauba, spermaceti and like waxes, as well as mixtures of such waxes with plasticizing and thermoplastic materials.

In its general aspects, the method of recovering wax and paper pulp or fibers from waxed "broke", comprises first mechanically disintegrating the "broke" in water; the temperature of the water being raised during this operation to a point at or somewhat above the melting point of the wax content of the "broke". This operation results in both a separation of the fibers of the paper constituent of the "broke" and a melting of the wax constituent thereof. After the "broke" has thus been disintegrated, and while mechanical agitation of the fluid mass or mixture of the thus disintegrated "broke" and water is continued, an emulsifying agent is added to the mass or mixture which is operative upon the wax present therein to convert the latter into a stable emulsion. Once the emulsion is formed, the same may be washed away and thereby separated from the paper fibers so that the latter are purged of wax, whereby the clean paper fibers or pulp remaining is fit for re-use as paper making stock; or the mixture of emulsion and paper fibers may be added to a fresh batch of paper making stock which it is desired to wax size.

Ordinary emulsifying agents, which, for their emulsifying effect, depend largely upon the use of high speed agitating equipment or the use of homogenizing apparatus, cannot be satisfactorily employed in my recovery process, since it is essential to the practical operation of the latter that the emulsifying agent be of such character as to function immediately to emulsify the melted wax content of the disintegrated mass of paper fibers, wax and water when merely added to the latter and mixed therewith under such relatively slow agitation thereof as is attained in the ordinary paper pulp beaters known to and used by the paper making industry, and such as would commonly be used in the disintegration of the waxed "broke" in the manner and for the purposes above stated. Not only must the emulsifying agent function under the conditions last mentioned, but it must also be of such character and effect as to produce a stable emulsion of the melted wax, so that substantially complete separation of the wax from the paper fibers may be assured when this is desired.

I have found that an emulsifying agent or mixture which responds to all the above indicated requirements, and which is essential to the attainment of the aforesaid recovery effects, comprises a mixture of oil-soluble petroleum sulfonates (known as mahogany soaps) and sulfonated vegetable or animal oils or waxes. Among the sulfonated oils which may be used are e. g. oleic acid, cottonseed oil, castor oil, wool-grease, sperm oil, etc. Among the sulfonated waxes which may be used are e. g. carnauba wax, Montan wax, spermaceti, and various other animal or vegetable waxes. While either a sulfonated animal or vegetable wax or a sulfonated oil may be employed with oil-soluble petroleum sulfonates in the make-up of the emulsifying agent operative to form a wax emulsion of sufficient stability for my purposes, the sulfonated waxes or a sulfonated oil containing waxes may perhaps be preferable since the wax emulsion formed thereby is of greater stability.

As one specific illustration of the application and effects of the recovery methods according to my invention, I give the following example:

The waxed "broke" to be treated is deposited in an ordinary paper pulp beater or similar apparatus together with water; the amount of the latter being in the proportion of about 95 per cent. The operation of the beater functions to disintegrate or defiber the "broke". While the "broke" is undergoing such disintegration or break-down, the temperature of the water content of the mass is gradually raised to that equivalent to or somewhat above the melting point of the wax content of the "broke". Since the melting point of waxes commonly used in the making of waxed paper rarely exceeds 155 degrees F., the temperature of the water need not be raised higher than approximately 160 degrees F., which will be sufficiently high to assure the melting of the wax; and, of course, the water temperature may be even lower than this if lower melting point waxes are being dealt with.

After the wax content of the disintegrated "broke" is melted down, the emulsifying agent is added directly into the beater, and while operation of the latter is continued. For example, an emulsifying agent comprising a mixture of approximately equal parts of mahogany soap and sulfonated wool-grease may be used. The amount by volume of emulsifying agent should be in a proportion of approximately one part of emulsifying agent to four parts of wax present in the batch of "broke" under treatment. The quantity of wax in a given batch of "broke" is subject to estimation sufficiently close to permit of calculation of the aforesaid proportions. Upon adding the emulsifying agent to the batch of disintegrated "broke" (which now comprises loose paper fibers and melted wax suspended in water), while the beater is continued in operation so as to agitate the mixture, the emulsifying agent will react upon the wax to rapidly form the same into a stable emulsion.

After the wax emulsion is formed, the paper fibers and the emulsified wax are available for re-use. If it is desired to recover the paper fibers for re-use in making up fresh paper stock, the emulsified wax may be washed away from the fibers by the usual methods of washing or cleansing pulp preparatory to delivery to paper making machines, thus leaving clean fibers which can be added to new paper stock to be utilized in the making of ordinary paper. If, on the other hand, it is desired to re-use the recovered wax carried in the emulsion for wax sizing paper stock preparatory to making new waxed paper, the mixture of paper fibers and emulsified wax can be added directly to new paper stock in such proportion as will produce the desired amount of wax sizing. In the latter case some additional fresh wax size may be also added to bring the proportion of total wax to the amount required for wax sizing a given quantity of paper stock; generally speaking, from one-eighth to four per cent of wax is required for the wax sizing of paper stock. When used as a size, the wax emulsion is made to break by treatment with papermaker's alum, the effect of which is to release the wax and to precipitate the same upon the paper fibers; this being common and well-known practice.

The particular materials, quantities, times, temperatures and steps of procedure hereinabove specifically mentioned are subject to more or less variation, and consequently it is intended that, in these respects, the matter contained in the above description shall be interpreted as illustrative and not in a limiting sense.

I claim:

1. In a process for reclaiming the constituents of waxed paper "broke", the steps which comprise disintegrating the "broke" in water heated to a temperature sufficiently high to melt the wax constituent and emulsifying the wax with an agent comprising a mineral oil sulfonate and a sulfonated substance selected from the group consisting of animal and vegetable oils, fats and waxes.

2. A process for reclaiming the constituents of waxed paper "broke" which comprises disintegrating the broke in water heated to a temperature sufficiently high to melt the wax constituent, emulsifying the wax with an agent comprising a mineral oil sulfonate and a sulfonated substance selected from the group consisting of animal and vegetable oils, fats and waxes and separating the emulsified wax and paper fiber.

3. A process for reclaiming the constituents of waxed paper "broke" which comprises disintegrating the broke in water heated to a temperature sufficiently high to melt the wax constituent, emulsifying the wax with an agent comprising a mineral oil sulfonate and a sulfonated substance selected from the group consisting of animal and vegetable oils, fats and waxes and using the fiber and wax emulsion in the make-up of fresh paper stock.

4. A process for reclaiming the constituents of waxed paper "broke" which comprises disintegrating the broke in water heated to a temperature sufficiently high to melt the wax constituent, emulsifying the wax with an agent comprising mahogany soaps and a sulfonated wool grease and separating the emulsified wax and paper fiber.

5. A process for reclaiming the constituents of waxed paper "broke" which comprises disintegrating the broke in water heated to a temperature sufficiently high to melt the wax constituent, emulsifying the wax with an agent comprising mahogany soaps and a sulfonated sperm oil and separating the emulsified wax and paper fiber.

6. A process for reclaiming the constituents of waxed paper "broke" which comprises disintegrating the broke in water heated to a temperature sufficiently high to melt the wax constituent, emulsifying the wax with an agent comprising mahogany soaps and a sulfonated wool grease and using the fiber and wax emulsion in the make-up of fresh paper stock.

7. A process for reclaiming the constituents of waxed paper "broke" which comprises disintegrating the broke in water heated to a temperature sufficiently high to melt the wax constituent, emulsifying the wax with an agent comprising mahogany soaps and a sulfonated sperm oil and using the fiber and wax emulsion in the make-up of fresh paper stock.

ARNOLD M. HILL.